United States Patent [19]
Burelbach et al.

[11] Patent Number: 4,645,638
[45] Date of Patent: Feb. 24, 1987

[54] HANGING CORE SUPPORT SYSTEM FOR A NUCLEAR REACTOR

[75] Inventors: James P. Burelbach, Glen Ellyn; William J. Kann, Park Ridge; Yen-Cheng Pan, Naperville; James G. Saiveau, Hickory Hills; Ralph W. Seidensticker, Wheaton, all of Ill.

[73] Assignee: The United States of America as represented by the United States Department of Energy, Washington, D.C.

[21] Appl. No.: 604,200

[22] Filed: Apr. 26, 1984

[51] Int. Cl.$^4$ .................... G21C 17/00; G21C 13/00
[52] U.S. Cl. .................... 376/254; 376/258; 376/404; 376/461
[58] Field of Search .............. 376/362, 363, 461, 290, 376/403–405, 254, 258, 302, 303, 304

[56] References Cited

U.S. PATENT DOCUMENTS

| | | |
|---|---|---|
| 3,130,130 | 4/1964 | Haines et al. .................... 376/461 X |
| 3,821,079 | 6/1974 | Jabsen . |
| 3,906,469 | 9/1975 | Kronk .................... 376/258 X |
| 3,936,350 | 2/1976 | Borst . |
| 4,096,034 | 6/1978 | Anthony . |
| 4,097,332 | 6/1978 | Gibbons et al. . |
| 4,131,510 | 12/1978 | Cooper . |
| 4,172,010 | 10/1979 | Seed et al. .................... 376/461 X |
| 4,172,011 | 10/1979 | Seed et al. . |
| 4,302,296 | 11/1981 | Sharbaugh et al. .................... 376/290 |
| 4,318,776 | 3/1982 | Pröll et al. .................... 376/254 |

Primary Examiner—Deborah L. Kyle
Assistant Examiner—John S. Maples
Attorney, Agent, or Firm—Charles F. Lind; Gustavo Siller, Jr.; Judson R. Hightower

[57] ABSTRACT

For holding the reactor core in the confining reactor vessel, a support is disclosed that is structurally independent of the vessel, that is dimensionally accurate and stable, and that comprises tandem tension linkages that act redundantly of one another to maintain stabilized core support even in the unlikely event of the complete failure of one of the linkages. The core support has a mounting platform for the reactor core, and unitary structure including a flange overlying the top edge of the reactor vessels, and a skirt and box beams between the flange and platform for establishing one of the linkages. A plurality of tension rods connect between the deck closing the reactor vessel and the platform for establishing the redundant linkage. Loaded Belleville springs flexibly hold the tension rods at the deck and separable bayonet-type connections hold the tension rods at the platform. Motion or radiation sensing detectors can be provide at the lower ends of the tension rods for obtaining pertinent readings proximate the core.

19 Claims, 6 Drawing Figures

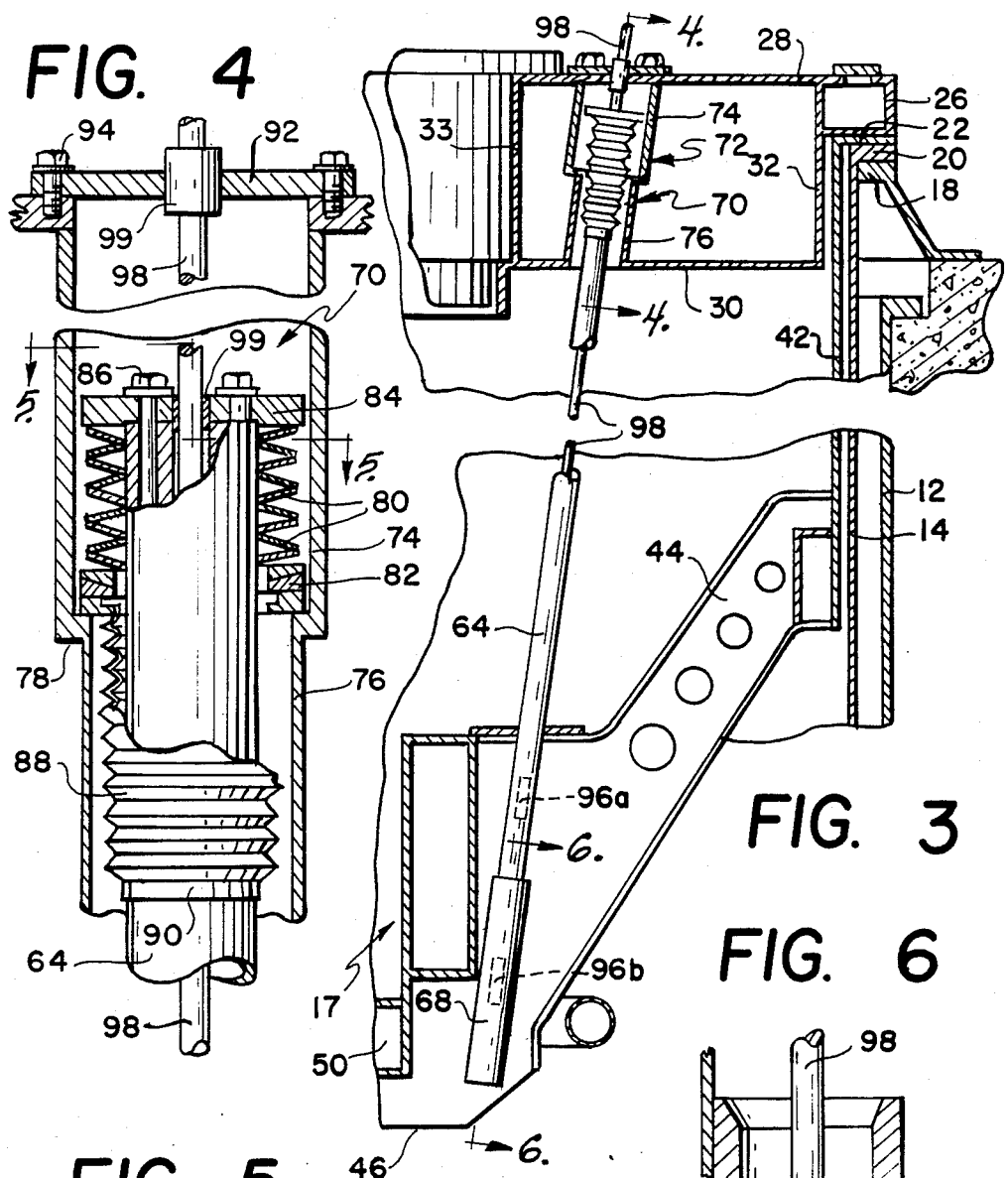
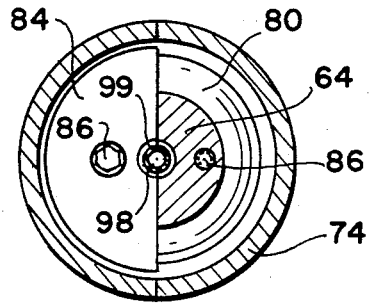
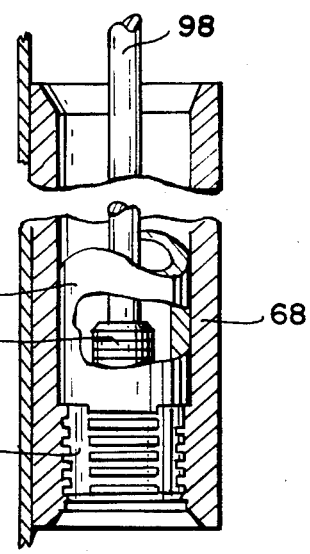
FIG. 4
FIG. 3
FIG. 5
FIG. 6

HANGING CORE SUPPORT SYSTEM FOR A NUCLEAR REACTOR

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

A nuclear reactor has a core defining many parallel passages within which fuel elements and control elements are supported in different interrelated matrixes. The presence of the control elements relative to the fuel elements determines the reactivity beyond critical and thus the output of the reactor. Coolant is forced through the passages over the fuel and control elements for transferring the generated heat to heat exchanger means or the like whereby steam can be produced externally of the reactor and used to perform useful work.

One form of nuclear reactor, known as the liquid metal fast breeder reactor, uses molten sodium as the coolant; and in the pool type, the core is submerged in a pool of the sodium held in a reactor vessel. In the conventional pool type sodium cooled reactor, the core is supported from the reactor vessel, while the control elements are supported from a deck carried from and closing the top of the reactor vessel. This control element support arrangement is preferred for safety reasons, in that should the upper internal structures for holding the control elements fail and thereby drop the control elements further into the reactor core, their increased presence would reduce the reactivity of the reaction. On the other hand, there is also the possibility—much more remote—that the reactor vessel might fail and drop the core away from the control elements; which would increase the reactivity and possibly cause overheating damage to the core.

Of interest also, the reactor vessel must support all of the sodium coolant (which in a conventional 1000 MW electric reactor design can be in excess of 3,000 megagrams of sodium) and must also support the reactor core itself. The design must not only support these loads under static conditions, but must withstand seismic events, etc., which can generate appreciably greater dynamic loads. Consequently, the reactor vessel must be both durable and of high structural integrity.

In designing the reactor against seismic loading, one of the most important safety considerations is the relative motion of the reactor core and the control elements. For maximum safety, the movement of the reactor core should be minimized. If the reactor core is supported off the vessel side or bottom and the entire sodium inventory is brought into motion within the vessel, the flexibility of the vessel can allow the reactor core to move then relative to the reactor deck and the controls suspended therefrom. Even though the net movement of the control elements may be small compared to their total intentional movement, such can vary the control output of the reaction, both increasing and decreasing it. Also, this motion can induce stresses in the vessel and in the control structure.

SUMMARY OF THE INVENTION

This invention provides support for the reactor core that is structurally independent of the reactor vessel, thereby decoupling the core from the reactor vessel and its contents.

A basic object of this invention is to provide a core support structure that is dimensionally accurate and stable and independent of the reactor vessel, so that the criticality of the reactor vessel itself being dimensionally accurate and stable is reduced, as the vessel need only hold the solium coolant. Moreover, the core support structure can be independently strengthened as required to withstand seismic events, etc., while further the reactor vessel can possibly be structurally reduced in capacity as it need only provide for the coolant confinement and not stabilized core support.

Another object of this invention is to provide a core support system having a core support platform and separate structures secured at their lower ends to the core support platform and secured at their upper ends respectively relative to the vessel top and to the deck. The separate structures of the system act redundantly to support the core support platform, each preventing the platform from dropping within or relative to the reactor vessel even in the unlikely event of a complete failure of the other.

Another object of this invention is to provide core support structure that can be fabricated as a module externally of the reactor vessel and loaded then as a unit in place within the reactor vessel, so as to allow for easier and faster assembly techniques and eliminate much on site work formerly required with individual components.

Another object of this invention is to provide core support structure that can further utilize motion sensing detectors, strain gauges or the like to sense any relative movement between the core support platform and the deck itself operable thereby as an alert for a possible failure of the core support structure or any other structural component within the system. Also, instrumentation can be provided at the lower ends of the core support structures at the core support platform for determining core radioactivity, temperature, etc., useful in the control and safety of the reactor. The support structure could be removably joined by bayonet connections or the like to the core support platform to allow for easy removal and replacement for enhanced reactor safety.

A specific feature of this invention provides a core support design of the hanging type independent of the lower regions of the reactor vessel, so that the reactor vessel need only carry the sodium coolant and not any primary controls for the fission reaction. This design has an important safety advantage, i.e., the failure of the reactor vessel only means loss of the sodium coolant but does not affect the placement of the reactor core and the degree of fission reaction. Moreover, the independent core support reduces the needs of the reactor vessel insofar as its rigidity, strength and dimensional tolerances, thereby can be cost effective.

Another specific feature of this invention provides a core support having an upper flange secured in lapping relation to the top flange of the reactor vessel, a lower core support platform, and spaced skirt and beam structures between the upper flange and lower core support platform. The core rests on the support platform and appropriate piping to this area directs the coolant to the core for upward flow through the core passages.

The basic invention thus provides a redundant hanging core support structure effective to protect against the unlikely failure of either independent support means. The hanging core support structure consists of four major parts: a platform on which the reactor core is supported; a skirt and its flange connected to the top of the reactor vessel; a plurality of box beams between the skirt and platform; and a plurality of tension rods between the vessel deck and platform. The core support platform supports the reactor core and core barrel, the core support grid, fixed neutron shield around the core, and a redan assembly in the coolant pool. The tension rods are supported from the deck by loaded Belleville springs and are attached to the core support platform by separable bayonet-type connections.

The reactor deck and the reactor vessel form the primary system pressure boundary. The reactor deck is stiff and leak-tight formed by stressed cross walls and circular and box-beam interconnecting walls and gussets. The deck supports the primary pump, the intermediate heat exchangers, rotatable fuel element locating plugs, thermal and neutron shieldings, and the passive shutdown heat removal systems. The reactor vessel, the deck, and the core support structure are supported from a common conical support skirt via overlapped flanges.

BRIEF DESCRIPTION OF THE DRAWINGS

FIG. 3 is an elevational sectional view, somewhat the same as that seen in FIG. 1 except to a larger scale, showing additional details of the subject invention;

FIG. 4 is an enlarged sectional view as seen generally from line 4—4 in FIG. 3;

FIG. 5 is a cross sectional view as seen generally from line 5—5 in FIG. 4; and

FIG. 6 is an enlarged sectional view as seen generally from line 6—6 in FIG. 3.

DETAILED DESCRIPTION OF THE PREFERRED EMBODIMENT

Figure 1:
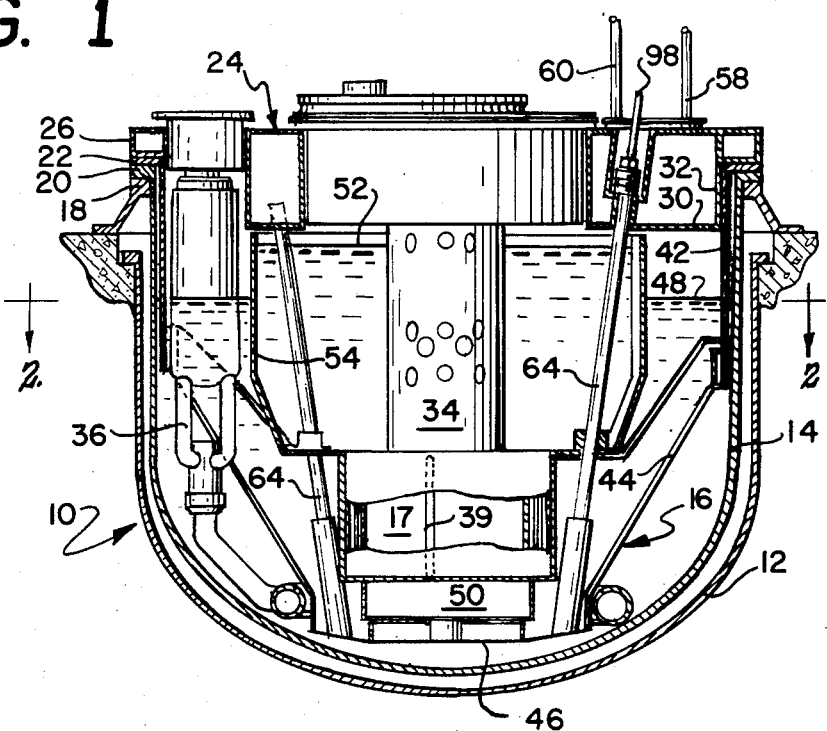
FIG. 1 is an elevational view, partly in longitudinal cross section as seen from line 1—1 in FIG. 2, of a liquid metal fast breeder pool type reactor having a preferred embodiment of the subject invention incorporated therein.
Figure 2:
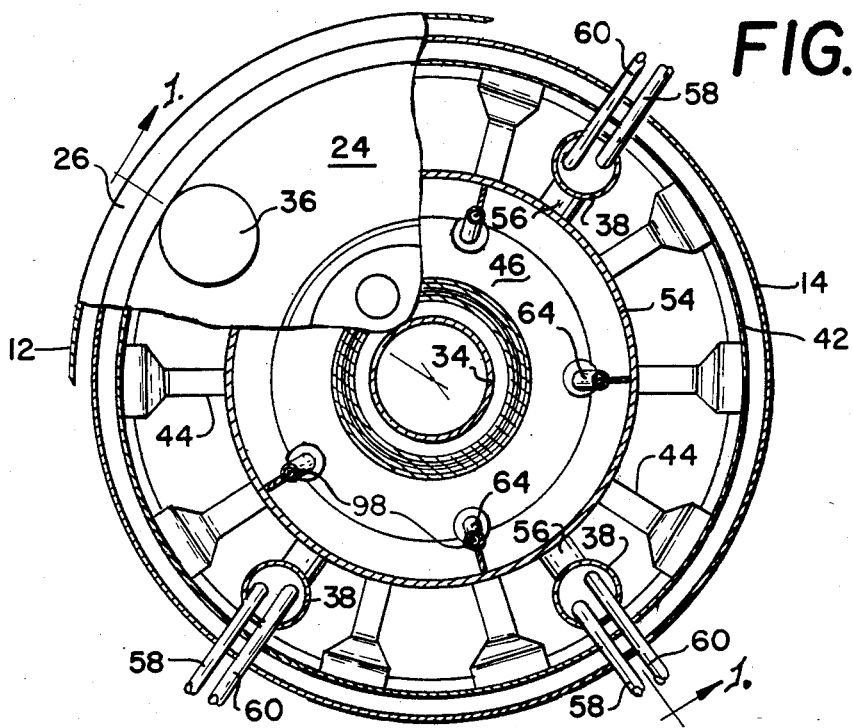
FIG. 2 is a top plan view, partly shown in section as seen generally from line 2—2 in FIG. 1, illustrating additional components of the reactor.

In FIG. 1 the reactor 10 illustrated has a guard vessel 12 disposed with direct ground or concrete backing, a reactor vessel 14 disposed with clearance therearound within the guard vessel 12, a core support structure 16 disposed within the reactor vessel 14, and a reactor core 17 supported by the core support structure 16 within the reactor vessel 14.

An annular ledge 18 secured relative to the guard vessel 12 and/or concrete backing provides common support for lapped flanges 20 and 22 respectively of the reactor vessel 14 and the core support structure 16. A deck 24 closes the open top of the reactor vessel 14 and includes a flange 26 which is supported across the lapped flanges 20 and 22 on the annular ledge 18.

The deck 24 has upper and lower cross walls 28 and 30 (see FIG. 3) and vertical walls extended between the cross walls, including outer circumferential wall 32 and inner circumferential walls (like 33) surrounding various components supported by the deck 24 as will be noted. The reactor deck thus is structural and supports a number of reactor components including upper internal control structure 34 (FIG. 1) overlying the core 17, and several pumps (only one at 36 being shown) and several heat exchangers 38, the pumps and heat exchangers being radially offset from and circumferentially spaced apart around the central core 17.

The core 17 defines many vertical passages (not shown) and many elongated fuel elements and control elements (only one fuel element 39 being shown schematically in FIG. 1) are arranged in the core passages according to a definite matrix. The upper internal structure 34 raises and lowers the control elements relative to the fuel elements so as to provide adjustment of the relative presence of the fuel and control elements and thus the fission output.

The core support structure 16 (see FIGS. 1 and 3) includes the upper flange 22 having a cylindrical skirt 42 downwardly depending therefrom and beams or arms 44 that connect off the skirt 42 and angle downwardly and inwardly to connect with a core support platform 46. The reactor core 17 is supported relative to the support platform 46.

The reactor vessel 14 is liquid-tight and is filled with a coolant, in this case a liquid metal coolant such as sodium, which defines thereby a pool 48 almost totally covering the core support structure 16 and completely covering the core 17. The pump 36 has its inlet from the pool 48 and its outlet connected to a grid 50 located below and inletting to the passages of the core 17. A redan 52 is contained within an upstanding wall 54 over the upper ends of the core passages, and the redan communicates via passages 56 through the heat exchanger 38 back to the pool 48. Operation of the pump 36 thereby forces the coolant from the pool 48 into the grid 50 and upwardly through the core passage and over the fuel and control elements therein and via the redan 52 to and through the heat exchangers. This flow cools the fuel and control elements, and a separate coolant is directed by appropriate conduits 58 and 60 to, through and from each heat exchanger 38 for carrying the heat from the reactor output to exterior steam generator means (not shown) whereby steam can be generated by the heat generated in the reactor system.

This invention provides for controlled support of the reactor core 17 by means independent of the reactor vessel 14, to the extent that its underlying position can be maintained quite accurately relative to the overlying deck 24 and the annular support ledge 18 whereby failure or flexure of the reactor vessel 14 would have no effect on the reactor output. As noted, the core support structure 16 includes the support platform 46 and the linkage structure integral therewith of the flange 22, the skirt member 42, and the arms 44. The support platform 46 thereby is suspended by this integral linkage structure relative to the annular ledge 18, across the sandwiched reactor vessel flange 20, operable to hold the core 17 at this fixed depth within the reactor vessel 14 and fixed distance below the overlying reactor deck 24 and the upper internal control structure 34.

Further, support rods 64 are provided, extending between the deck 24 and core support platform 46. In the illustrations of FIGS. 1, 3 and 6, a separable bayonet type connection 66 is provided at the lower end of each support rod 64 relative to a support bracket or sleeve 68 that in turn is secured at the peripheral edge of the support platform 46 to the core support structure 16. The upper end of each support rod 64 (see FIGS. 1, 3 and 4) is supported by a flexible connection 70 relative to the deck 24. Thus, a support socket 72 is formed by a cylindrically arranged cylindrical walls 74 and 76 having an annular shoulder 78 defined therebetween, where the rod extends with clearance within the socket.

A plurality of Belleville springs 80 fit over the rod, trapped between swivel washers 82 supported on the shoulder 78 relative to the deck 24 and end cap 84 held relative to the upper end of the rod by bolts 86. A bellows 88 is sealed at one end to one of the swivel washers 82 and extends axially over the rod 64 to its opposite end which is sealed to the rod as illustrated at 90. This precludes the migration into the deck of fission gases and/or cover gases confined within the reactor vessel and overlying the coolant pool. An access cover 92 overlying the socket structure 72 is secured in place on the upper deck wall 28 by bolts 94 to provide access to the connection 70 of the rod 64. Perhaps six to twelve rods 64 are used, circumferentially spaced around the support platform 68.

The reactor core 17 is thus supported on the support platform 46, which in turn is supported by the integral linkage means (22, 42, 44) of the core support structure 16 relative to the annular ledge 18, and by the rods 64 via the flexible connection 70 including the Belleville springs 80 relative to the deck 24. This provides redundant support of the support platform, and support that is independent of the reactor vessel 14. This allows for the stable mounting of the core 17 relative to the overlying upper internal control structure 34 supported on the deck 24, surviving even the failure of the reactor vessel itself. Of course, failure of the reactor vessel 24 and leakage from the vessel of its contained coolant will allow overheating of the reactor and its core, but the reactor output as set by the reactor upper internal control structure 34 will not be increased because of its failure. The overlying deck 24 and its rod support of the support platform 46 is independent of the platform support provided by the core support structure itself; and this redundancy in structure complies with all and exceeds safety requirements of such a reactor vessel and reactor control.

Under a preferred mode of design, the support structure 16 would bear the greater portion of the load of the support platform 46 and all reactor components supported thereby (of the order of between 90 and 75%) while the tension rods 64 would carry the balance. Moreover, the Belleville springs 80 would be very stiff to deflect very little beyond the initial deflection incurred in carrying this shared load (between 10 and 25%) to that of carrying the entire load of the support platform in the unlikely event of the total failure of the support structure 16, such as any of the integral linkage to the platform 46 including the flange 22, skirt 42, or beams 44.

The tension rods 64 not only provide redundant support of the core but also can house instrumentation as indicated schematically at 96a and 96b in FIGS. 3—6, effective to monitor the neutron and/or gamma detection count, or movement of the reactor core relative the deck. Each rod 64 can be made tubular and a separate rod 98 can be fitted therein, having the monitors 96 secured thereto at the height required relative to the core, and the free end thereof of the rod 98 can extend through seals 99a, 99b in the reactor deck caps 84 and 92 to a readout device (not shown) outside of the reactor.

The deck is basically very stiff and incurs little seismic load deformation, even for earthquake intensity of 6.5 on the Richter scale. The maximum anticipated horizontal and veritcal displacements of the core 17 and the upper internal control 34 relative to one another are expected to be less than approximately 3-6 centrimeters. The vertical acceleration of the core is anticipated to be less than 0.76 g to minimize lift off of the reactor core relative to its support platform.

The disclosed hanging core support system is thus redundant, highly versatile, and completely decouples the core from the reactor vessel. The reactor vessel need only contain the sodium coolant, so that reactor vessel failure only means loss of the coolant to the surrounding guard vessel and not movement of the reactor core—and the consequential increases in the fission reaction and output. The reactor vessel thus can be made thinner with an overall commodity saving for the system. The hanging core support system has the advantage of ease of construction, since it can be fabricated outside of the containment and installed in place without the need of structural welding inside the containment. Since in-containment welding is most critical and costly, this can result in a significant construction cost savings.

The embodiments of the invention in which an exclusive property or privilege is claimed are defined as follows:

1. In combination with a nuclear reactor having a guard vessel disposed in a ground connected foundation, an open top reactor vessel having an uppermost portion closed by a deck, a pool of sodium coolant in the reactor vessel, and a core disposed in the coolant, the improvement comprising an integral core support platform underlying the core, and integral linkage means including a flange lying directly on the uppermost portion of the reactor vessel and lying directly under said deck, a skirt depending downwardly from the flange adjacent but independent of the reactor vessel, and beams between the skirt and the support platform, the core support means operatively suspending the reactor core independently of the reactor vessel and said deck.

2. A nuclear reactor combination according to claim 1, wherein said ground connected foundation includes direct ground or concrete backing.

3. A nuclear reactor combination according to claim 2, wherein said flange is coupled to the direct ground or concrete backing by an annular ledge.

4. The nuclear reactor combination according to claim 3 wherein said annular ledge is secured to said reactor guard vessel.

5. The nuclear reactor combination according to claim 3 wherein said annular ledge is secured directly by said ground or concrete backing.

6. A nuclear reactor combination according to claim 1, further having tension rods connected between the support platform and the deck for holding the reactor core independently and redundantly of the linkage means of the core support means.

7. A nuclear reactor combination according to claim 6, further providing that under normal design conditions the linkage means supports in the range between 90 and 75% of the load on the support platform while the tension rods support the balance.

8. A nuclear reactor combination according to claim 6, further including instrumentation sensors housed within the tension rods proximate to core effective to detect core radiation, and/or core movement relative to the deck.

9. A nuclear reactor combination according to claim 6, further including a releasable connection means between each of the tension rods and the platform.

10. A nuclear reactor combination according to claim 9, wherein each releasable connection means is in the form of a bayonet connector.

11. A nuclear reactor combination according to claim 6, further providing that the connection between the deck and each of the tension rods is flexible.

12. A nuclear reactor combination according to claim 11, wherein each flexible connection further includes a plurality of Belleville springs overlying the tension rod, and means to trap the Belleville springs on the top side relative to the rod and on the bottom side relative to the deck.

13. A nuclear reactor combination according to claim 11, further including a releasable connection means between each of the tension rods and the platform.

14. A nuclear reactor combination according to claim 11, wherein each releasable connection means is in the form of a bayonet connector.

15. A nuclear reactor combination according to claim 14, wherein each flexible connection further includes a plurality of Belleville springs overlying the tension rod, and means to trap the Belleville springs on the top side relative to the rod and on the bottom side relative to the deck.

16. A nuclear reactor combination according to claim 14, further providing that under normal design conditions the linkage means supports in the range between 90 and 75% of the load on the support platform while the tension rods support the balance.

17. A nuclear reactor combination according to claim 14, further including instrumentation sensors supported by said tension rods proximate to core effective to detect core radiation, and/or core movement relative to the deck.

18. A nuclear reactor combination according to claim 17, wherein each flexible connection further includes a plurality of Belleville springs overlying the tension rod, and means to trap the Belleville springs on the top side relative to the rod and on the bottom side relative to the deck.

19. A nuclear reactor combination according to claim 18, further providing that under normal design conditions the linkage means supports in the range between 90 and 75% of the load on the support platform while the tension rods support the balance.

* * * * *